(12) United States Patent
Lin et al.

(10) Patent No.: US 11,048,966 B2
(45) Date of Patent: Jun. 29, 2021

(54) METHOD AND DEVICE FOR COMPARING SIMILARITIES OF HIGH DIMENSIONAL FEATURES OF IMAGES

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Xidong Lin, Beijing (CN); Chuan Mou, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 822 days.

(21) Appl. No.: 15/746,794

(22) PCT Filed: Jul. 13, 2016

(86) PCT No.: PCT/CN2016/089866
§ 371 (c)(1),
(2) Date: Jan. 22, 2018

(87) PCT Pub. No.: WO2017/012491
PCT Pub. Date: Jan. 26, 2017

(65) Prior Publication Data
US 2018/0349735 A1    Dec. 6, 2018

(30) Foreign Application Priority Data

Jul. 23, 2015  (CN) .......................... 201510436176.6

(51) Int. Cl.
*G06K 9/62* (2006.01)
*G06F 16/31* (2019.01)
(Continued)

(52) U.S. Cl.
CPC ........... *G06K 9/6215* (2013.01); *G06F 16/00* (2019.01); *G06F 16/2255* (2019.01);
(Continued)

(58) Field of Classification Search
CPC .. G06K 9/6215; G06K 9/4671; G06K 9/6247; G06F 16/316; G06F 16/2255;
(Continued)

(56) References Cited

U.S. PATENT DOCUMENTS

2007/0276733 A1* 11/2007 Geshwind .............. G06Q 30/02
705/14.49
2008/0212899 A1* 9/2008 Gokturk ............. G06Q 30/0603
382/305

(Continued)

FOREIGN PATENT DOCUMENTS

CN           103345496 A       10/2013
CN           104050247 A        9/2014
(Continued)

OTHER PUBLICATIONS

Ebraheem, Muhammad, et al. "DeepER—Deep Entity Resolution." arXiv preprint arXiv:1710.00597 (2017). (Year: 2017).*
(Continued)

*Primary Examiner* — Eric Nilsson
(74) *Attorney, Agent, or Firm* — Michael Best & Friedrich LLP (57) ABSTRACT

The present invention provides a method and device for comparing similarities of high dimensional features of images, capable of improving the retrieval speed and retrieval precision in a similarity retrieval from massive images based on Locality Sensitive HASH (LSH) code. The method for comparing similarities of high dimensional features of images according to the present invention comprises: reducing dimensions of extracted eigenvectors of the
(Continued)

images by the LSH algorithm to obtain low dimensional eigenvectors; averagely segmenting the low dimensional eigenvectors and establishing a segment index table; retrieving the segmented low dimensional eigenvector of a queried image from the segment index table to obtain a candidate sample set; and performing a similarity metric between a sample in the candidate sample set and the low dimensional eigenvector of the queried image.

7 Claims, 4 Drawing Sheets

(51) Int. Cl.

| | | |
|---|---|---|
| G06F 16/532 | (2019.01) | |
| G06F 16/22 | (2019.01) | |
| G06F 16/00 | (2019.01) | |
| G06K 9/46 | (2006.01) | |
| G06F 17/10 | (2006.01) | |
| G06N 3/02 | (2006.01) | |
| G06N 7/00 | (2006.01) | |
| G06N 3/04 | (2006.01) | |

(52) U.S. Cl.
CPC .......... *G06F 16/316* (2019.01); *G06F 16/532* (2019.01); *G06F 17/10* (2013.01); *G06K 9/4671* (2013.01); *G06K 9/6247* (2013.01); *G06N 3/02* (2013.01); *G06N 7/00* (2013.01); *G06N 3/0454* (2013.01)

(58) Field of Classification Search
CPC ........ G06F 16/532; G06F 16/00; G06F 17/10; G06N 3/02; G06N 7/00; G06N 3/0454
See application file for complete search history.

(56) References Cited

U.S. PATENT DOCUMENTS

| | | | |
|---|---|---|---|
| 2011/0158533 A1* | 6/2011 | Gutelzon | G06K 9/4638 |
| | | | 382/176 |
| 2013/0212090 A1 | 8/2013 | Sperling et al. | |
| 2015/0104073 A1 | 4/2015 | Rodriguez-Serrano et al. | |
| 2015/0169644 A1* | 6/2015 | Gong | G06F 16/532 |
| | | | 707/769 |
| 2017/0139913 A1* | 5/2017 | Hsiao | G06F 16/2255 |

FOREIGN PATENT DOCUMENTS

| | | |
|---|---|---|
| CN | 104572804 A | 4/2015 |
| CN | 105095435 A | 11/2015 |

OTHER PUBLICATIONS

Jégou, Hervé, et al. "Query adaptative locality sensitive hashing." 2008 IEEE International Conference on Acoustics, Speech and Signal Processing. IEEE, 2008. (Year: 2008).*

Kong, Weihao, Wu-Jun Li, and Minyi Guo. "Manhattan hashing for large-scale image retrieval." Proceedings of the 35th international ACM SIGIR conference on Research and development in information retrieval. 2012. (Year: 2012).*

International Search Report and Written Opinion with English translation for Application No. PCT/CN2016/089866 dated Oct. 13, 2016 (8 pages).

Tsymbal et al., "Eigenvector-based Feature Extraction for Classifcation", FLAIRS-02 Proceedings, 2002, pp. 354-358.

Intellectual Property Office of India First Examination Report for Application No. 201827005852 dated Mar. 27, 2021 (8 pages).

* cited by examiner

METHOD AND DEVICE FOR COMPARING SIMILARITIES OF HIGH DIMENSIONAL FEATURES OF IMAGES

TECHNICAL FIELD

The present application relates to the technical field of a computer, in particular to a method and device for comparing similarities of high dimensional features of images.

BACKGROUND ART

In today's Internet environment, Internet users also want to retrieve multimedia contents such as voice, images and videos, in addition to needs for text retrieval. As regarding the image retrieval, a user expects Internet service providers to find out a set of candidate images similar to the image provided by himself/herself for querying.

Examples of applicable scenarios include electronic commerce enterprises recommending the same or similar styles of commodities based on commodity images provided by users, search sites displaying similar images according to landscape pictures provided by users, etc.

Traditional image retrieval is generally made by performing a similarity metric based on manually specified image features. Due to the semantically non-structured characteristics of image data, it is difficult to discover representative features manually. The technique of deep learning for neural network proposed by Hinton et al. enables the feature extraction, i.e., an efficient mapping from the high dimensional eigenvector space to the lower dimensional eigenvector space of a raw image, by self-learning, which improves greatly the efficiency for feature representation in the image field.

In the Internet industry, service companies often have huge storage of images. As regarding the retrieval needs from users, if the retrieval results need to be obtained within a second-level response time, in addition to using the large-scale parallel computing technology, it is also required to increase the speed in the dimension reduction, indexing, and matching algorithms. The Locality Sensitive Hash (LSH) algorithm is a kind of dimension reducing coding technique, which is characterized by keeping the relative position in the original eigenvector space in the generated HASH code, and thus can be used for the quick retrieval of images.

In the prior art, the LSH algorithm for image retrieval mainly includes the following steps of:

1. LSH Coding for an Image

Figure 1:
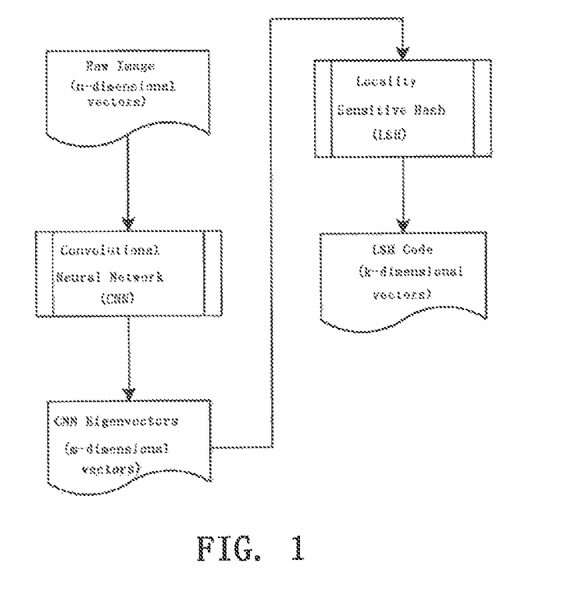
FIG. 1 is a schematic diagram of the process of generating LSH code of an image in the prior art.

The process of LSH coding for an image is shown in FIG. 1. The raw image is represented as an n-dimensional vector for a RKGB channel, and then the output of hidden layers (usually from the last but one layer to the fourth layer from the bottom) obtained through coding the n-dimensional vector by a convolutional neural network (CNN) is taken as the m-dimensional eigenvector of the image (the typical length of dimension is 4096). The eigenvector is then converted to k-dimensional (k is much less than m) LSH code after applying a set of LSH vector operations to the m-dimensional eigenvector. According to this method, service enterprises convert all of the pictures into such codes, and then the similarity retrieval for subsequent images is made based on such image representation.

2. Similarity Retrieval for the Image

Figure 2:
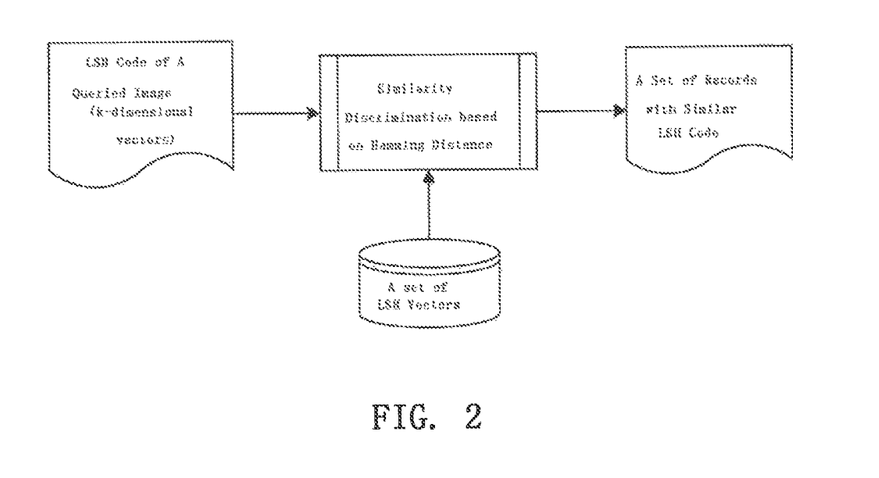
FIG. 2 is a schematic diagram of the image similarity retrieving process in the prior art.

The process of similarity retrieval for the image is shown in FIG. 2. Firstly, the LSH code (vector A) of the image uploaded by the user for querying is obtained through the aforesaid Step 1, and then for each vector (vector B) in the LSH vector table, the Hamming distance between vector A and B is calculated. Subsequently, the vectors are sorted in an ascending order according to the calculated distances, and finally the raw images corresponding to several top vectors are returned to the user as a result of the similarity retrieval.

However, applying the existing LSH algorithm to an image retrieval method has the following disadvantages in use:

1. The speed of the similarity retrieval based on LSH coding is still relatively slow in the case that a set of images is relatively large (e.g., containing millions, ten millions of images and more).

2. Although the Hamming distance metric is faster than the Euclidean distance metric and the Manhattan distance metric, etc. in proper term of the calculation speed, the accuracy thereof decreases a lot and the retrieval result is unsatisfactory.

SUMMARY OF THE INVENTION

In view of this, the present invention provides a method and device for comparing similarities of high dimensional features of images. By the method of segment indexing and segment retrieving LSH codes of images, and applying the Manhattan distance to the similarity metric, the retrieval speed and retrieval accuracy are improved in the similarity retrieval from massive images based on LSH coding.

To achieve the above object, according to one aspect of the present invention, a method for comparing similarities of high dimensional features of images is provided.

The method for comparing similarities of high dimensional features of images according to the present invention, comprises: reducing dimensions of extracted eigenvectors of the images by Locality Sensitive HASH (LSH) algorithm to obtain low dimensional eigenvectors; averagely segmenting the low dimensional eigenvectors and establishing a segment index table; retrieving the segmented low dimensional eigenvector of a queried image from the segment index table to obtain a candidate sample set; and performing a similarity metric between each sample in the candidate sample set and the low dimensional eigenvector of the queried image.

Optionally, the image eigenvectors are extracted with a neural network constructed using a deep learning technique.

Optionally, the neural network is a convolutional neural network.

Optionally, prior to the step of averagely segmenting the low dimensional eigenvectors, the method further comprises experimentally determining an optimal segment length on a smaller verification set.

Optionally, the step of averagely segmenting the low dimensional eigenvectors and establishing a segment index table comprises: averagely segmenting the low dimensional eigenvectors, using the segmented eigenvectors as index items, and calculating fingerprint of each of the index items; performing a remainder operation on the fingerprint with a prime number which is closest to a predetermined number of entries contained in the segment index table to obtain entry addresses for the index items; and inserting the low dimensional eigenvectors into the segment index table according to the obtained entry addresses to establish the segment index table.

Optionally, the step of retrieving the segmented low dimensional eigenvector of a queried image from the segment index table to obtain a set of candidate sample comprises: accessing an entry address of the segmented low dimensional eigenvector of the queried image to obtain a conflict set; extracting the low dimensional eigenvectors corresponding to a node of the conflict set, which has the same fingerprint as that of the segmented low dimensional eigenvector of the queried image, as a candidate set; and combining the candidate set obtained by respective segment retrievals and removing therefrom duplicated low dimensional eigenvectors to obtain a candidate sample set.

Optionally, the step of performing a similarity metric between each sample in the candidate sample set and the low dimensional eigenvector of the queried image comprises: calculating scores of Manhattan distances between each sample in the candidate sample set and the low dimensional eigenvector of the queried image; and sorting the scores according to an ascending order, and taking images corresponding to the samples with a predetermined number of top scores as similar images of the queried image.

According to another aspect of the present invention, a device for comparing similarities of high dimensional features of images is provided.

A device for comparing similarities of high dimensional features of images according to the present invention, comprises: a feature dimension reducing module for reducing dimensions of extracted eigenvectors of the images by LSH algorithm to obtain low dimensional eigenvectors; a segment indexing module for averagely segmenting the low dimensional eigenvectors and establishing a segment index table; a similarity querying module for retrieving the segmented low dimensional eigenvector of a queried image from the segment index table to obtain a candidate sample set; and a comparison metric module for performing a similarity metric between each samples in the candidate sample set and the low dimensional eigenvector of the queried image.

Optionally, the image eigenvectors are extracted with a neural network constructed using a deep learning technique.

Optionally, the neural network is a convolutional neural network.

Optionally, prior to the step of averagely segmenting the low dimensional eigenvectors, the segment indexing module is further for experimentally determining an optimal segment length on a smaller verification set.

Optionally, the segment indexing module is further for: averagely segmenting the low dimensional eigenvectors, using the segmented eigenvectors as index items, and calculating fingerprint of each of the index items; performing a remainder operation on the fingerprint with a prime number which is closest to a predetermined number of entries contained in the segment index table to obtain entry addresses for the index items; and inserting the low dimensional eigenvectors into the segment index table according to the obtained entry addresses to establish the segment index table.

Optionally, the similarity querying module is further for: accessing an entry address of the segmented low dimensional eigenvector of the queried image to obtain a conflict set; extracting the low dimensional eigenvectors corresponding to a node of the conflict set, which has the same fingerprint as that of the segmented low dimensional eigenvector of the queried image, as a candidate set; and combining the candidate set obtained by respective segment retrievals and removing therefrom duplicated low dimensional eigenvectors to obtain a candidate samples set.

Optionally, the comparison metric module is further for: calculating scores of Manhattan distances between each sample in the candidate sample set and the low dimensional eigenvector of the queried image; and sorting the scores according to an ascending order, and taking images corresponding to the samples with a predetermined number of top scores as similar images of the queried image.

According to the technical solution of the present invention, by establishing a segment index for dimension-reduced eigenvectors of LSH code for images, the retrieval speed can be expedited to improve the retrieval efficiency. In the similarity retrieval of an image, by using the Manhattan distance metric in replacement of the traditional Hamming distance metric, quantifiable distance information contained in the LSH code can be utilized sufficiently to improve the retrieval accuracy in the segment retrieval.

BRIEF DESCRIPTION OF THE DRAWINGS

The drawings are for better understanding of the present invention, and do not constitute improper limitations of the invention.

PREFERRED EMBODIMENTS

The exemplary embodiments of the present invention are described below with reference to the accompanying drawings, in which various details of the embodiments of the present invention are included to facilitate understanding, and should be considered as merely exemplary. Accordingly, those skilled in the art appreciate that various changes and modifications may be made to the embodiments described herein without departing from the scope and spirit of the invention. Also, for clarity and conciseness, descriptions of well-known functions and constructions are omitted from the following descriptions.

Figure 3:
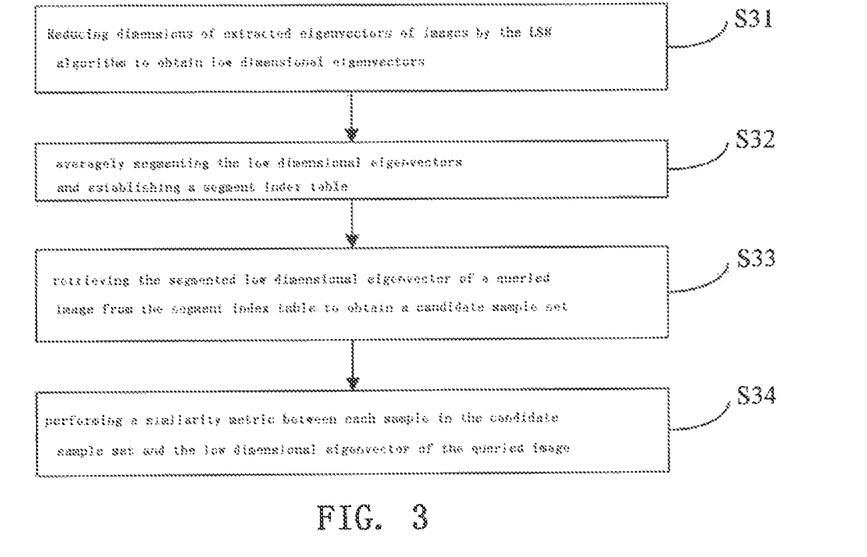
FIG. 3 is a schematic diagram of the main steps of a method for comparing similarities of high dimensional features of images according to the embodiment of the present invention.

The implementation of the present invention will be described below with reference to FIG. 3 to FIG. 6. FIG. 3 is a schematic diagram of the main steps of a method for comparing similarities of high dimensional features of images according to the embodiment of the present invention. As shown in FIG. 3, a method for comparing similarities of high dimensional features of images according to the present invention includes the following Steps S31 to S34.

Step S31: reducing dimensions of extracted eigenvectors of images by LSH algorithm to obtain low dimensional eigenvectors. The eigenvectors of the images in the step may be extracted with a neural network constructed using a deep learning technique.

Figure 4:
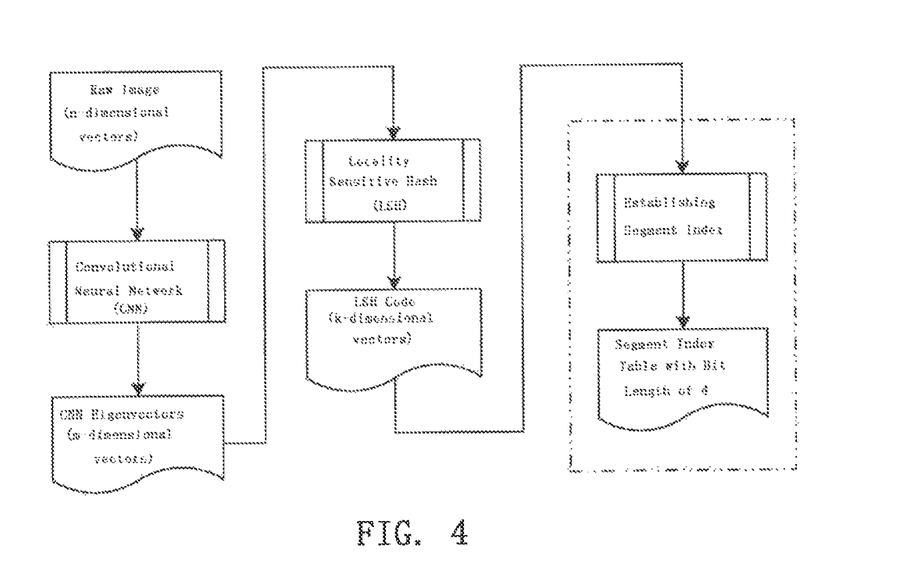
FIG. 4 is a schematic diagram of the process of generating LSH code of an image and establishing a segment index according to the implementation of the present invention.

Generally the neural network used is a convolutional neural network CNN. Now referring to the schematic diagram of the process of generating LSH code of an image and establishing a segment index according to the implementation of the present invention as shown in FIG. 4, a raw image is subject to feature extracting through the convolutional neural network CNN to obtain the m-dimensional eigenvectors for CNN. Subsequently, the m-dimensional eigenvectors are subject to dimension reducing through LSH to obtain LSH code of lower (e.g., k that is far less than m) dimensional eigenvectors.

Step S32: averagely segmenting the low dimensional eigenvectors and establishing a segment index table. Prior to the step of averagely segmenting the LSH code and establishing a segment index, an optimal segment length may be determined experimentally on a smaller verification set so that the technical solution of the present invention obtains a relatively satisfactory compromise between the retrieval speed and precision. Subsequently, the low dimensional vectors of LSH code are averagely segmented according to the determined optimal segment length d. As an example, LSH code of sample numbered 1001 is:

[0,1,1,0,0,3,1,0,1,0,2,1,0,1,2,1,1,0,1,−1,2,1,0,1,1,1,0,0].

If the optimal segment length d is 7, it needs to be divided into four segments, and the obtained segment index items are:

1[0,1,1,0,0,3,1], 2[0,1,0,2,1,0,1], 3[2,1,1,0,1,−1,2], 4[1,0,1,1,1,0,0]

Wherein the number before each segment represents the positioning number—the first segment is 1, the second segment is 2, and so on.

After the low dimensional eigenvectors of LSH code are averagely segmented, a segment Hash index table is established in memory for the low dimensional eigenvectors. The main steps can be summarized as follows:

Step S321: averagely segmenting the low dimensional eigenvectors, using the segmented eigenvectors as index items, and calculating fingerprint of each of the index items;

Step S322: performing a remainder operation on the fingerprint with a prime number which is closest to a predetermined number of entries contained in a segment index table to obtain entry addresses for the index items; and Step S323: inserting the low dimensional eigenvectors into the segment index table according to the obtained entry addresses to establish the segment index table.

Figure 5:
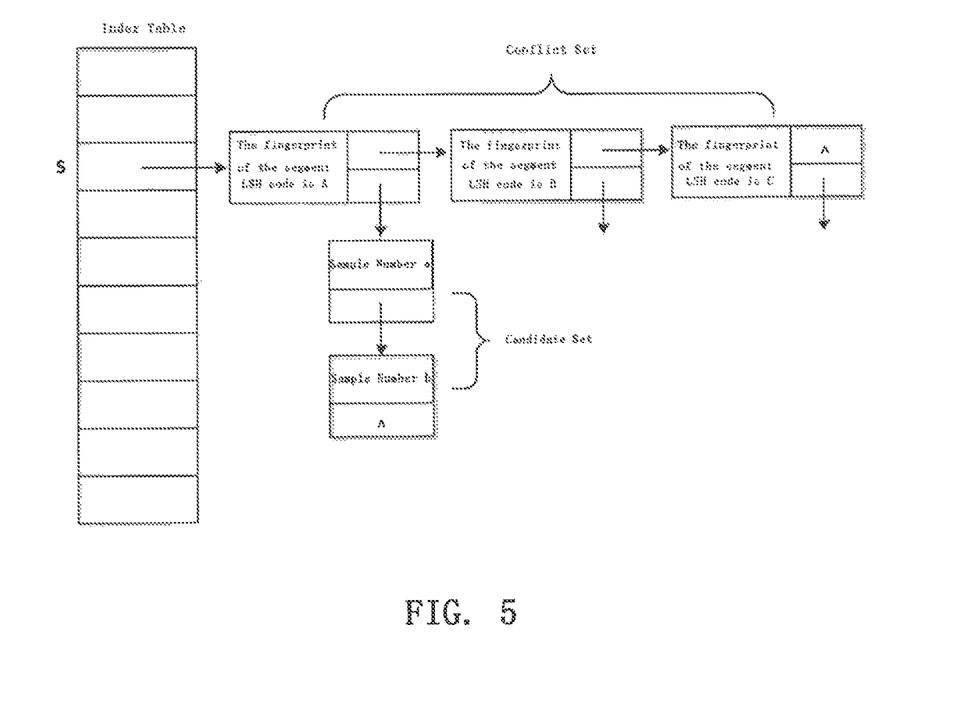
FIG. 5 is a structural diagram of the segment Hash index table according to the implementation of the present invention.

With reference to the structure diagram of the segmented hash index table according to the implementation of the present invention shown in FIG. 5, the foregoing sample numbered 1001 is taken as an example for description. After the sample is divided into four segments, the segmented eigenvectors is used as an index item, and the fingerprint of each segment index item is calculated. For example, the fingerprint of each index item can be obtained by calculating with the fifth generation of the message-digest algorithm (that is, the MD5 function). Then, a remainder operation on these fingerprint with a prime number which is closest to a predetermined number of entries contained in the segment index table to obtain the entry address for each of the index items. The number of entries N of the segment index table may be set as needed, for example, according to the size of the memory of the machine or the requirements for realizing the function, etc. In the practice, since the number of the segment index items is large, the entry addresses of the index items may be duplicated, which is generally referred as "key conflict". The index items with key conflict are saved in the form of a linked-list for a conflict set. Finally, the low dimensional eigenvectors of LSH code are inserted into the segment index table according to the obtained entry addresses to establish the segment index table.

Through the above steps S31 and S32, the process of generating LSH code of an image and establishing a segment index according to the implementation of the present invention can be practiced. The image similarity retrieval process based on the segment index will be described below with reference to the accompanying drawings.

Step S33: retrieving the segmented low dimensional eigenvector of a queried image from the segment index table to obtain a candidate sample set. The similar image retrieval process may be implemented based on the following steps of:

Step S331: accessing an entry address of the segmented low dimensional eigenvector of the queried image to obtain a conflict set;

Step S332: extracting the low dimensional eigenvectors corresponding to a node of the conflict set, which has the same fingerprint as that of the segmented low dimensional eigenvector of the queried image, as a candidate set; and Step S333: combining the candidate set obtained by respectively retrieving in segment retrievals and removing therefrom duplicated low dimensional eigenvectors to obtain a candidate sample set.

With reference to the structure of the segment Hash index table shown in FIG. 5, the process of retrieving for a candidate sample set is introduced by taking the foregoing sample numbered 1001 as an example. For example, in step S331, firstly, the fingerprint of each segment index item is calculated to find the entry address S of each segment index item in the index table, and the corresponding linked-list for the conflict set is obtained by accessing the entry address S. The rightward pointer of each node in the linked-list for the conflict set is used to indicate the inked-list for the conflict set, and the downward pointer is used to indicate the linked-list for the candidate set. The so-called candidate set is for a candidate sample set corresponding to the segment index items of nodes which will be subject to particular distance comparison, wherein the fingerprints of the "segment LSH codes" (segment index items) of nodes are the same as those of segment index items of a certain queried image. The candidate samples herein are the corresponding low dimensional eigenvectors. As stated in Step S332, the candidate sets is extracted. Finally, as stated in Step S333, after all the segment retrievals are completed, all the obtained candidate sets are combined, and the duplicated low dimensional eigenvectors are removed to finally obtain the candidate sample set for distance comparison.

Step S34: performing a similarity metric between each sample in the candidate sample set and the low dimensional eigenvector of the queried image. In the similarity metric, firstly scores of Manhattan distance between each sample in the candidate sample set and the low dimensional eigenvector of the queried image are calculated, and the scores are sorted according to an ascending order, and images corresponding to the samples with a predetermined number of top scores are taken as similar images of the queried image.

According to the Manhattan distance principle, the smaller the score is, the higher the similarity is. Therefore, based on the calculated Manhattan distance score, the similarities can be compared and sorted. In practice, the number of similar images to be displayed may be preset according to the needs of the application, or be selected by the user himself or herself.

Figure 6:
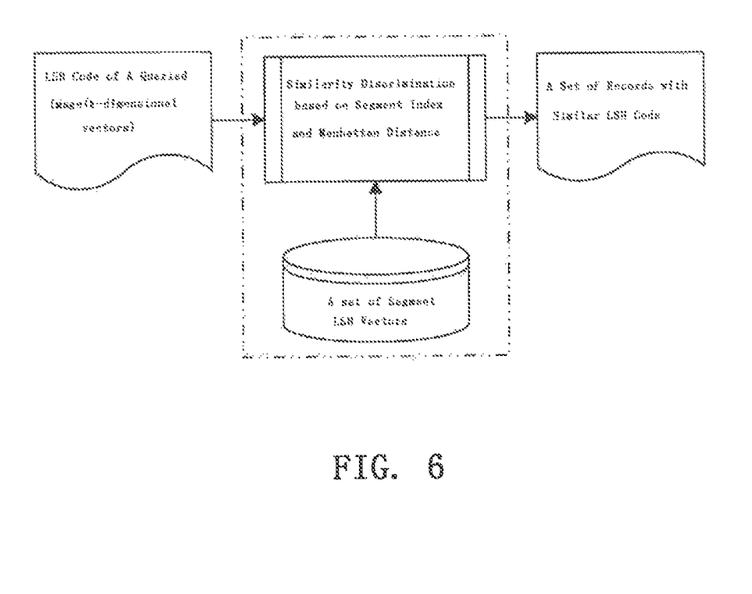
FIG. 6 is a schematic diagram of the image similarity retrieving process based on the segment index according to the implementation of the present invention.

The process of image similarity retrieval based on a segment index according to the implementation of the present invention shown in FIG. 6 can be implemented through the above step S33 and step S34. That is, the similarity between the low dimensional eigenvector of the queried image and each one of the vector set for segment LSH code is respectively discriminated based on the segment index and the Manhattan distance.

Finally, a set of records with similar LSH code is obtained to get the corresponding similar images.

The technical solution of the present invention can be implemented through the above steps S31 to S34. Through experiments, as regarding a set of one million pictures 512-bit LSH code will be obtained from the eigenvector of the third layer from the bottom of a convolutional neural network. If the segment length d of 24 bits is chosen and the index is established, in term of image similarity retrieval, the retrieval speed is about 1000 times faster than direct pair-wise comparison without the segment. That is, the retrieval speed with the segment index has been greatly improved over the comparison directly based on the original LSH code. In addition, since the LSH code contains quantifiable distance information, the distance information can be utilized sufficiently when the Manhattan distance is used for similarity metric, while the Hamming distance is more proper to compare equality of digits. So the retrieval accuracy of the similarity metric based on the Manhattan distance is higher than that based on the Hamming distance. A large number of experimental data shows that the retrieval accuracy thereof is about 5% higher.

Figure 7:
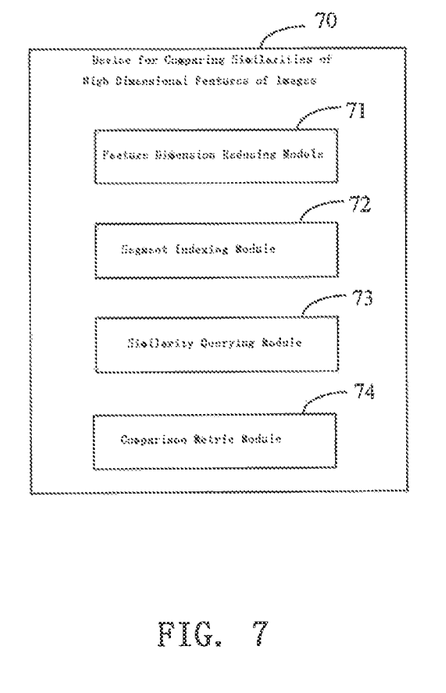
FIG. 7 is a schematic diagram of the main modules of a device for comparing similarities of high dimensional features of images according to the embodiment of the present invention.

FIG. 7 is a schematic diagram of the main modules of a device for comparing similarities of high dimensional features of images according to the embodiment of the present invention. As shown in FIG. 7, a device for comparing similarities of high dimensional features of images 70 in the embodiment of the present invention mainly comprises a feature dimension reducing module 71, a segment indexing module 72, a similarity querying module 73, and a comparison metric module 74.

The feature dimension reducing module 71 is for reducing dimensions of the extracted eigenvectors of images by the LSH algorithm to obtain low dimensional eigenvectors.

The segment indexing module 72 is for averagely segmenting the low dimensional eigenvectors and establishing a segment index table. Prior to the step of averagely segmenting the low dimensional eigenvectors, the segment indexing module 72 is further for experimentally determining an optimal segment length on a smaller verification set.

The segment indexing module 72 is further for: averagely segmenting the low dimensional eigenvectors, using the segmented eigenvectors as index items, and calculating fingerprint of each of the index items; performing a remainder operation on the fingerprint with a prime number which is closest to a predetermined number of entries contained in the segment index table to obtain entry addresses for the index items; and inserting the low dimensional eigenvectors into the segment index table according to the obtained entry addresses to establish the segment index table.

The similarity querying module 73 is for retrieving the segmented low dimensional eigenvector of a queried image from the segment index table to obtain a candidate sample set; and The similarity querying module 73 is further for: accessing an entry address for the segmented low dimensional eigenvector of the queried image to obtain a conflict set; extracting the low dimensional eigenvectors corresponding to a node of the conflict set, which has the same fingerprint as that of the segmented low dimensional eigenvector of the queried image, as a candidate set; and combining the candidate set obtained by respective segment retrievals and removing therefrom duplicated low dimensional eigenvectors to obtain a candidate sample set.

The comparison metric module 74 is for performing a similarity metric between each sample in the candidate sample set and the low dimensional eigenvector of the queried image.

The comparison metric module 74 is further for: calculating scores of Manhattan distances between each sample in the candidate sample set and the low dimensional eigenvector of the queried image; and sorting the scores according to an ascending order, and taking images corresponding of the samples with a predetermined number of top scores as similar images of the queried image.

According to the technical solution of the embodiment of the present invention, by establishing a segment index of of dimension-reduced eigenvectors of LSH code for images, the retrieval speed can be expedited to improve the retrieval efficiency. In the similarity retrieval of an image, by using the Manhattan distance metric in replacement of the traditional Hamming distance metric, quantifiable distance information contained in the LSH code may be utilized sufficiently to improve the retrieval accuracy in the segment retrieval.

In addition, the process of establishing a segment index in the technical solution of the present invention may not be limited to be performed on one machine, and may be executed in parallel in a distributed scheduling system. In this way, data in a larger scale can be processed.

The above specific implementation does not constitute any limitation on the protection scope of the present invention. It should be understood by those skilled in the art that various modifications, combinations, sub-combinations and alterations may occur depending on design requirements and other factors. Any modification, equivalent replacement, improvement, etc. made within the spirit and principle of the present invention should be included in the protection scope of the present invention.

The invention claimed is:

1. A computer-implemented method for comparing similarities of high dimensional features of images, characterized in comprising:
reducing dimensions of extracted eigenvectors of the images by Locality Sensitive HASH (LSH) algorithm to obtain reduced dimensional eigenvectors;
averagely segmenting the reduced dimensional eigenvectors to obtain segmented reduced dimensional eigenvectors and establishing a segment index table for the segmented reduced dimensional eigenvectors;
retrieving the segmented reduced dimensional eigenvector of a queried image from the segment index table to obtain a candidate sample set;
performing a similarity metric between each sample in the candidate sample set and the reduced dimensional eigenvector of the queried image to select at least a subset of samples in the candidate sample set as similar images for the queried image; and
providing the similar images as a response for the queried image.

2. The method according to claim 1, characterized in that the image eigenvectors are extracted with a neural network constructed using a deep learning technique.

3. The method according to claim 2, characterized in that the neural network is a convolutional neural network.

4. The method according to claim 1, characterized in that prior to the step of averagely segmenting the reduced dimensional eigenvectors, the method further comprises:
experimentally determining an optimal segment length on a smaller verification set.

5. The method according to claim 1, characterized in that the step of averagely segmenting the reduced dimensional eigenvectors and establishing a segment index table comprises:

averagely segmenting the reduced dimensional eigenvectors, using the segmented eigenvectors as index items, and calculating fingerprint of each of the index items;

performing a remainder operation on the fingerprint with a prime number which is closest to a predetermined number of entries contained in the segment index table to obtain entry addresses for the index items; and inserting the reduced dimensional eigenvectors into the segment index table according to the obtained entry addresses to establish the segment index table.

6. The method according to claim 1, characterized in that the step of retrieving the segmented reduced dimensional eigenvector of a queried image from the segment index table to obtain a candidate sample set comprises:

accessing an entry address of the segmented reduced dimensional eigenvector of the queried image to obtain a conflict set;

extracting the reduced dimensional eigenvectors corresponding to a node of the conflict set, which has the same fingerprint as that of the segmented reduced dimensional eigenvector of the queried image, as a candidate set; and combining the candidate set obtained by respective segment retrievals and removing therefrom duplicated reduced dimensional eigenvectors to obtain a candidate sample set.

7. The method according to claim 1, characterized in that the step of performing a similarity metric between each sample in the candidate sample set and the reduced dimensional eigenvector of the queried image comprises:

calculating scores of Manhattan distances between each sample in the candidate sample set and the reduced dimensional eigenvector of the queried image;

sorting the scores according to an ascending order, and taking images corresponding to the samples with a predetermined number of top scores as the similar images of the queried image.

\* \* \* \* \*